Sept. 19, 1961 J. H. KARCHMER ET AL 3,000,988
PURIFICATION OF GAS
Filed Oct. 7, 1959
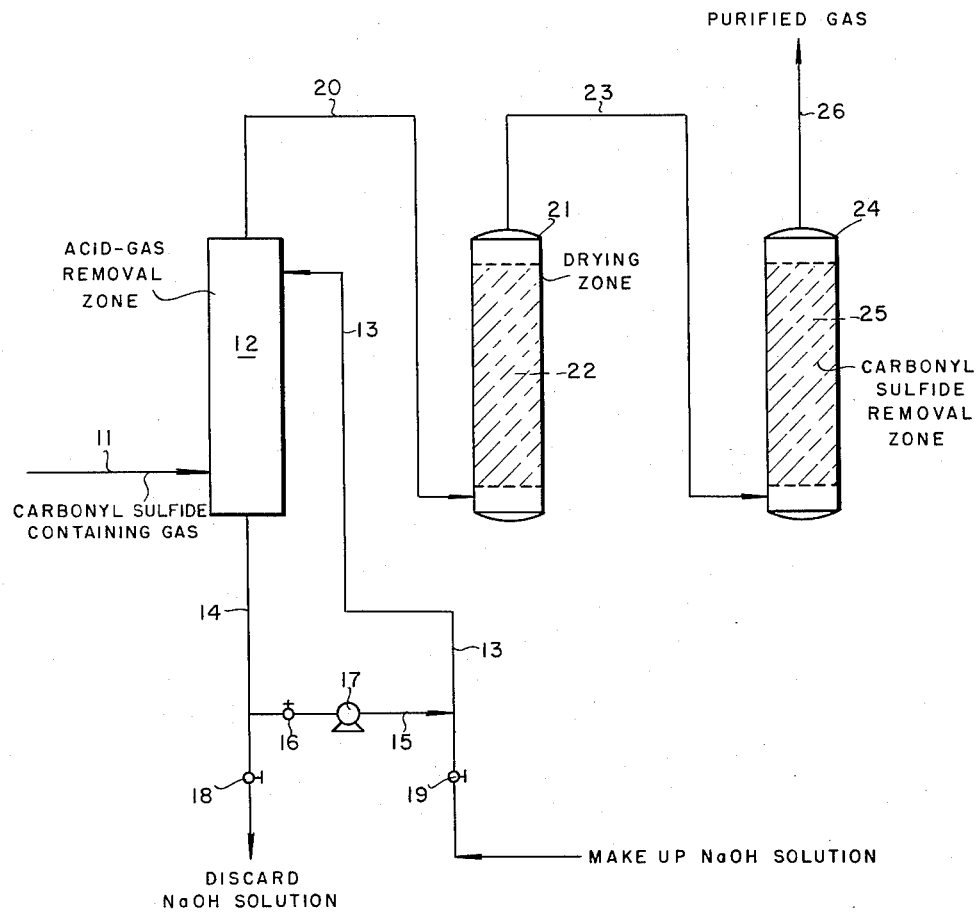
INVENTORS.
JEAN H. KARCHMER,
MARJORIE W. EASTWOOD
BY
ATTORNEY

3,000,988
PURIFICATION OF GAS

Jean H. Karchmer, Houston, and Marjorie T. Walker, Baytown, Tex., now by change of name Marjorie W. Eastwood, assignors, by mesne assignments, to Esso Research and Engineering Company, Elizabeth, N.J., a corporation of Delaware
Filed Oct. 7, 1959, Ser. No. 845,011
9 Claims. (Cl. 260—677)

The present invention is directed to the purification of gas. More particularly, the invention is concerned with the purification of olefinic gases containing carbonyl sulfide. In its more specific aspects, the invention is concerned with removing carbonyl sulfide from acidic gases containing carbonyl sulfide.

The present invention may be briefly described as a method for purifying gases such as olefins, which comprises contacting such gases containing carbonyl sulfide with soda-lime.

The soda-lime is preferably arranged in a bed in a contacting zone and may have a mesh size in the range from about 4 to about 20 mesh. A preferred mesh size may be in the range from about 8 to about 16 mesh.

The soda-lime may suitably be arranged in a bed supported on a carrier material. As examples of carrier material may be mentioned, kieselguhr, alumina, Floridin, diatomaceous earth, and the like. When the soda-lime is dispersed or carried by a carrier material, the carrier material and the soda-lime may have a mesh size within the range from about 4 to about 20 mesh, preferably in the range from about 8 to about 16 mesh.

Soda-lime is a mixture of hydrated lime and sodium hydroxide. The mixture may contain from about 0.5% to about 10% by weight of sodium hydroxide and about 90 to about 99.5% of hydrated lime. The mixture may suitably contain from about 0.1% to about 5% by weight of water, with best results being obtained about 0.1% by weight of water although good results may be obtained up to about 5% by weight of water.

Soda-lime employed in the practice of the present invention is described in an article by Arthur K. Lamb, Robert E. Wilson, and N. K. Chaney in the Journal of Industrial and Engineering Chemistry, Vol. 11, No. 5, page 420 and following entitled "Gas Mask Absorbents."

In employing the soda-lime in the practice of the present invention, the soda-lime is preferably arranged as a bed in a contacting zone. However, the soda-lime may be employed as a suspension suspended in the gas which is to be purified. In the instances where the soda-lime is suspended in the gaseous material which is to be purified, the soda-lime may have particle diameters in the range from about 0.5 to about 100 microns with the majority of the particle sizes being in the range from about 40 to about 80 microns. In practicing the present invention, it will be preferred to purify the acidic gas containing carbonyl sulfide by first removing acidic materials such as hydrogen sulfide, sulphur dioxide, carbon dioxide, hydrogen cyanide, and the like, and to remove water from the acidic material-free gas. Removal of hydrogen sulfide and other acidic gases may easily be performed by scrubbing the carbonyl sulfide-containing gas in a scrubber containing an aqueous solution of sodium hydroxide. For example, an aqueous solution of sodium hydroxide having a Baumé gravity in the range from about 1 to about 45° Baumé may be used. A preferred Baumé gravity may be about 20°.

The moisture may suitably be removed from the acidic gas-free carbonyl sulfide-containing gas by contacting the acid gas-free material with a bed of activated alumina to remove moisture.

It is to be understood however that other means may be employed for removing acidic gases besides those mentioned. For example, it is well known to scrub acid gases with various scrubbing mediums and it is contemplated to be within the purview of the present invention to use other means besides caustic scrubbing to remove acid gases.

Likewise, it is considered within the purview of this invention to use other means besides contacting with activated alumina to remove moisture from the gas. As exemplary thereof may be mentioned activated carbon and other adsorbent materials which will remove moisture from gases.

The present invention will be further illustrated by reference to the drawing in which the single figure is a flow diagram of a preferred mode.

Referring now to the drawing, numeral 11 designates a charge line by way of which a carbonyl sulfide-containing gas such as ethylene is introduced into an acid-gas removal zone 12. Acid-gas removal zone 12 is suitably an absorption tower containing bell cap plates or other suitable contacting means by way of which suitable contact is obtained between gases and liquids. Introduced into the top of contacting zone 12 by way of line 13 is an aqueous solution of sodium hydroxide. The descending sodium hydroxide solution contacts the ascending carbonyl sulfide containing-gas and substantially removes hydrogen sulfide, $SO_2$, hydrogen cyanide, and other acid gases therefrom. The used sodium hydroxide solution is withdrawn from zone 12 by way of line 14 and preferably is recycled at least in part by way of line 15 through line 13. It is to be noted that line 15 contains a valve 16 for control thereof and a pump 17. From time to time it may be desirable to withdraw a portion of the used sodium hydroxide solution and this may be accomplished by opening valve 18 in line 14. When used sodium hydroxide solution is discarded by opening valve 18, a like amount of fresh or makeup sodium hydroxide solution will be introduced by line 13 on manipulation of valve 19.

The carbonyl sulfide containing-gas substantially free of acidic material is withdrawn from zone 12 by way of line 20 and introduced thereby into a drying zone 21 which suitably may contain a bed 22 of activated alumina to remove moisture therefrom. On the carbonyl sulfide containing-gas circulating upwardly through the bed 22 substantially all of the moisture is removed therefrom and an effluent gas is removed from zone 21 by way of line 23 and introduced thereby into a carbonyl sulfide removal zone 24 which suitably contains a bed 25 of soda-lime. On circulation of the carbonyl sulfide containing-gas through zone 24, substantially all of the carbonyl sulfide is removed from the gas and a purified gas product is withdrawn by way of line 26 for use as may be desired. Purified ethylene may be used as a refrigerant or it may be used in chemical manufacture for example in the production of polyethylene by polymerization.

In order to illustrate the invention further, a number of runs were performed in which an ethylene gas containing 46 parts per million of carbonyl sulfide and 28 parts per million of acetylene was passed at a rate of 150 milliliters per minute through U-tubes in series having a combined volume of 90 milliliters and containing soda-lime. All of the carbonyl sulfide was removed with no apparent change in the acetylene content. The rate at which the ethylene gas was charged to the U-tubes corresponds to a space velocity of 100 v./v./hr. which is a practical plant operation.

In another operation as a gas rate of 800 milliliters per minute, appreciable amounts of the carbonyl sulfide pass through the U-tubes.

Another series of runs were made in which a gaseous blend containing a high concentration of carbonyl sulfide and ethylene was passed through a bed of soda-lime. Frequent analyses of the effluent gas were made to determine when the column or bed became saturated and permitted high concentration of carbonyl sulfide to pass through the bed. The results of these operations are shown in the following table which gives the carbonyl sulfide concentration of the inlet gas and exit gas, the weight and volume of the absorbent material, and the rate of gas flow. From these data the actual weight of carbonyl sulfide retained on the absorbent material and the weight of carbonyl sulfide retained per unit weight of absorbent were calculated.

|  | Absorbent | | Test Gas In— | | | Gas Out | | COS Retained | |
| --- | --- | --- | --- | --- | --- | --- | --- | --- | --- |
|  | Description | Wt., g. | Conc. COS, p.p.m. (wt.) | Rate, ml./ min. | Space Velocity, ml./ ml./hr. | Volume, liters | Conc. COS, p.p.m. (wt.) | Wt., g. | Wt. percent of Absorbent |
| Soda-Lime | 8–16 mesh, 5.2% H₂O | 25.9 (33 ml.) | 16,900 | 106 | 193 | 11.23 | 3.0 | 0.208 |  |
|  |  |  |  |  |  | 13.45 | 1.2 | 0.254 |  |
|  |  |  |  |  |  | 16.66 | 5.2 | 0.315 |  |
|  |  |  |  |  |  | 17.87 | 19.0 | 0.338 |  |
|  |  |  |  |  |  | 20.06 | 74.8 | 0.379 | 1.46 |
|  | 4–8 mesh, 0.94% H₂O. | 28.3 (36.0 ml.) | 16,000 | 100 | 167 | 10.43 | 7.5 | 0.197 |  |
|  |  |  |  |  |  | 13.35 | 3.5 | 0.253 |  |
|  |  |  |  |  |  | 18.10 | 4.2 | 0.342 |  |
|  |  |  |  |  |  | 20.25 | 4.9 | 0.382 |  |
|  |  |  |  |  |  | 25.69 | 0.2 | 0.486 |  |
|  |  |  |  |  |  | 31.69 | 0.7 | 0.599 |  |
|  |  |  |  |  |  | 34.72 | 0.4 | 0.656 |  |
|  |  |  |  |  |  | 38.82 | 0.4 | 0.734 |  |
|  |  |  |  |  |  | 40.55 | 0.8 | 0.766 |  |
|  |  |  |  |  |  | 43.19 | 7.1 | 0.816 | 2.88 |
|  |  |  |  |  |  | 45.21 | 27.3 | 0.855 | 3.02 |

From the data shown in the foregoing table, it will be clear that the soda-lime is a very good absorption material. It is to be noted that the first operation absorbs 1.46% of its weight while in the second operation the soda-lime absorbs 3.02 weight percent. The differences between the two absorbent materials are the particle size and the moisture content. The second operation with the lower moisture content (0.94%) was more efficient despite the fact that its particle size was larger (4 to 8 mesh) than the other material whose particle size was 8 to 16 mesh and whose moisture content was 5.2 weight percent. From these data, it will be clear that the moisture content within the range given and the mesh size of the particles may have an appreciable effect on the amount of the carbonyl sulfide which may be absorbed by the absorption material.

The present invention is applicable to various gases containing carbonyl sulfide, for example, the mono-olefins and the diolefins containing carbonyl sulfide may be substantially purified in accordance with the practice of the present invention. As exemplary of the gases which may be employed and purified in accordance with the practice of the present invention, may be mentioned the following: light gases obtained from the catalytic cracking of petroleum whose carbonyl sulfide content may be 80 p.p.m.; ethylene fraction which may contain 50 p.p.m. COS.

The present invention is quite advantageous and useful in that heretofore it was not possible practically to remove carbonyl sulfide from impure gases containing it in that expensive and lengthy purification procedures were necessary. It is clear that a new and substantially improved and useful process has been developed for removing carbonyl sulfide by contacting same with soda-lime.

The nature and objects of the present invention having been completely described and illustrated, what we wish to claim as new and useful and to secure by Letters Patent is:

1. A method for purifying an olefinic gas containing carbonyl sulfide which comprises contacting said gas with soda-lime containing from about 90% to about 99.5% by weight of hydrated lime and from about 0.5% to about 10% by weight of sodium hydroxide, the hydrated lime containing from about 0.1% to about 5.0% by weight of water.

2. A method in accordance with claim in which the gas is ethylene.

3. A method in accordance with claim 1 in which the gas is dry and free of acidic material.

4. A method in accordance with claim 1 in which the soda-lime is arranged in a bed.

5. A method in accordance with claim 1 in which the soda-lime is supported on a carrier.

6. A method in accordance with claim 1 in which the soda-lime is in the form of particles having a mesh size within the range from 4 to about 20 mesh.

7. A method for purifying an olefinic gas containing carbonyl sulfide, water, and acidic material which comprises removing water and acidic material from said gas and then contacting said water and acidic-material free gas with soda-lime containing from about 90% to about 99.5% by weight of hydrated lime and from about 0.5% to 10% by weight of sodium hydroxide, the hydrated lime containing from about 0.1% to about 5.0% by weight of water.

8. A method in accordance with claim 7 in which the gas is ethylene.

9. A method in accordance with claim 7 in which the gas is ethylene.

References Cited in the file of this patent

UNITED STATES PATENTS

| 480,312 | Amend et al. | Aug. 9, 1892 |
| 2,146,353 | Rosebaugh | Feb. 7, 1939 |
| 2,481,300 | Engel | Sept. 6, 1949 |